INFRARED ABSORPTION SPECTRUM OF MELINACIDIN

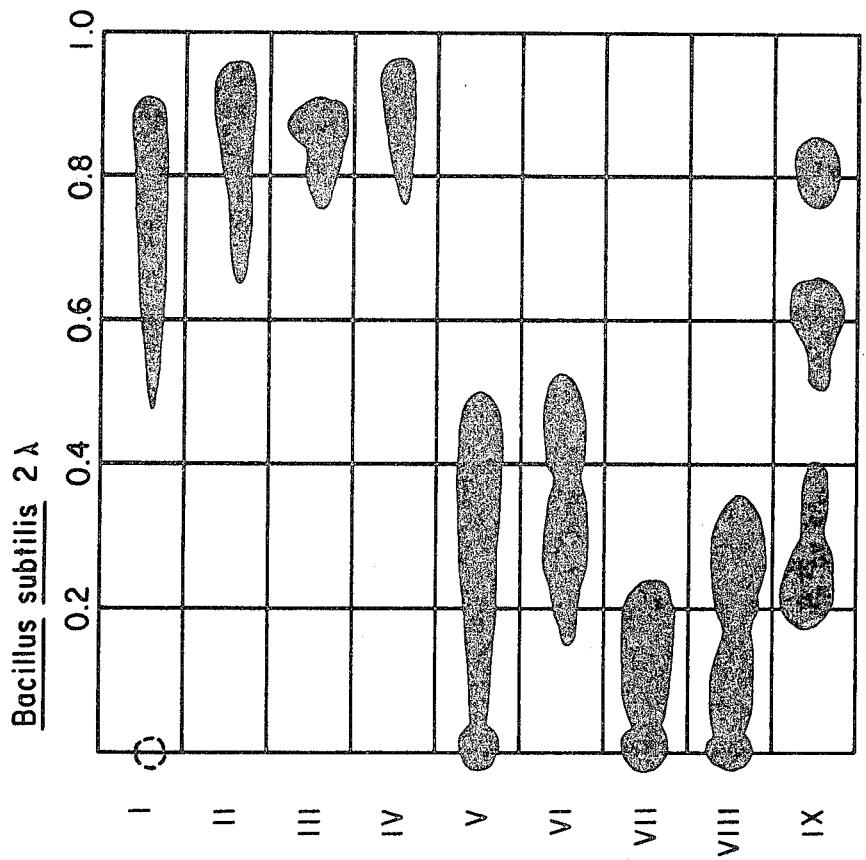

United States Patent Office 3,639,581
Patented Feb. 1, 1972

3,639,581
MELINACIDIN ANTIBIOTIC COMPLEX AND
PROCESS FOR PREPARING THE SAME
Alexander D. Argoudelis, Portage, John H. Coats, Kalamazoo, and Fritz Reusser, Portage, Mich., assignors to The Upjohn Company, Kalamazoo, Mich.
Filed Oct. 25, 1967, Ser. No. 678,046
Int. Cl. A61k 21/00
U.S. Cl. 424—117
8 Claims

ABSTRACT OF THE DISCLOSURE

Melinacidin antibiotic complex (U–26,362) producible by culturing Acrostalagmus cinnabarinus var. melinacidinus in a nutrient medium. Melinacidin antibiotic complex is antibacterially active and can be used to inhibit the growth of various microorganisms, for example, Bacillus substilis, Staphylococcus aureus, Salmonella pullorum, Streptococcus hemolyticus, Streptococcus faecalis, and Proteus vulgaris.

BRIEF SUMMARY OF THE INVENTION

Melinacidin is an unresolved mixture of antibiotics producible by culturing a melinacidin-producing Acrostalagmus in an aqueous nutrient medium. This unresolved mixture of antibiotics is referred to herein as melinacidin antibiotic complex or melinacidin. Melinacidin is a neutral substance which has the property of adversely affecting the growth of Gram-positive and Gram-negative bacteria, for example, Bacillus subtilis, Staphylococcus aureus, Salmonella pullorum, Streptococcus faecalis, and Proteus vulgaris, and can be used alone or in combination with other antibacterial agents to prevent the growth of, or reduce the number of, such microorganisms present in various environments. For example, it can be used as an oil preservative, for example, as a bacteriostatic agent for inhibiting the growth of Proteus vulgaris which is known to cause spoilage in cutting oils. Also, it is useful in wash solutions for sanitation purposes, as in the washing of hands and in the cleaning of equipment, floors, or furnishings of contaminated rooms or laboratories; it is also useful as an industrial preservative, for example, as a bacteriostatic rinse for laundered clothes and for impregnating papers and fabrics; and it is useful for suppressing the growth of sensitive organisms in plate assays and other microbiological media.

DETAILED DESCRIPTION

Chemical and physical properties of melinacidin

Figure 1:
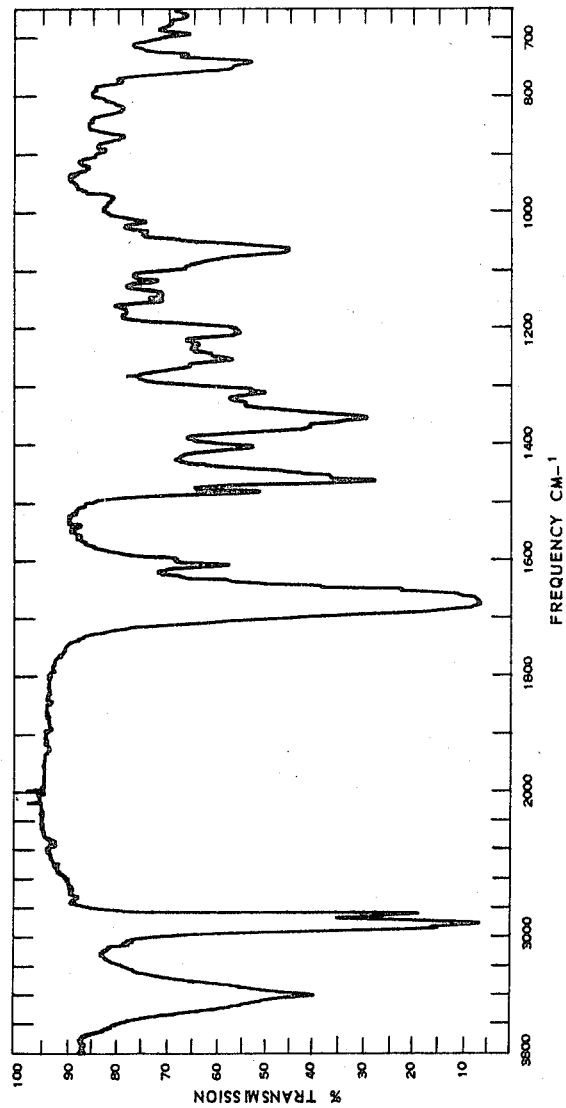
FIG. 1—Infrared absorption spectrum of melinacidin in mineral oil mull
FIG. 2—Infrared absorption spectrum of melinacidin in KBr disc
FIG. 3—Papergram of melinacidin.

*Elemental Analysis.*—Calc'd for $C_{16}H_{17}N_3S_2O_4$ (percent): C, 50.66; H, 4.48; N, 11.08; S, 16.89; O, 16.89. Found (percent): C, 50.33; H, 4.32; N, 10.51; S, 17.31; O, 16.52.

Ultraviolet spectrum: Melinacidin has the following UV absorption spectrum: $\gamma$ max. 300 m$\mu$ (a.=7.93, in ethanol).

Optical rotation: $[\alpha]_{25}^D = +736°$ (c., 0.394, $CHCl_3$).

Solubility: Melinacidin is soluble in chloroform, methylene chloride, dimethylformamide, and dimethylsulfoxide. Melinacidin has a lower degree of solubility in acetone and 95% ethanol, and is relatively insoluble in water and saturated hydrocarbon solvents, for example, n-hexane, cyclohexane, and isomeric hexanes.

Melting point: 228–231° C. (with decomposition).

Infrared spectrum: The infrared absorption spectrum of melinacidin suspended in mineral oil mull is reproduced in FIG. 1 of the drawing. Following is a tabulation of the wavelengths from FIG. 1 expressed in reciprocal centimeters:

| | | | |
|---|---|---|---|
| 3440 | M | 1260 | M |
| 3400 | M | 1254 | M |
| 2940 | S (Nujol) | 1229 | M |
| 2910 | S (Nujol) | 1209 | M |
| 2840 | S (Nujol) | 1200 | M |
| 1705 | M | 1175 | W |
| 1699 | M | 1150 | W |
| 1684 | S | 1139 | W |
| 1679 | S | 1118 | W |
| 1691 | S | 1094 | M |
| 1671 | S | 1079 | M |
| 1669 | S | 1064 | M |
| 1660 | S | 1034 | W |
| 1654 | S | 1015 | W |
| 1645 | M | 984 | W |
| 1634 | M | 974 | W |
| 1608 | M | 924 | W |
| 1597 | W | 903 | W |
| 1481 | M | 893 | W |
| 1464 | S | 869 | W |
| 1454 | M | 820 | W |
| 1448 | M | 774 | W |
| 1434 | M | 750 | M |
| 1404 | M | 740 | M |
| 1374 | M | 725 | W |
| 1358 | S | 689 | W |
| 1313 | M | 674 | W |
| 1309 | M | 659 | W |

Figure 2:
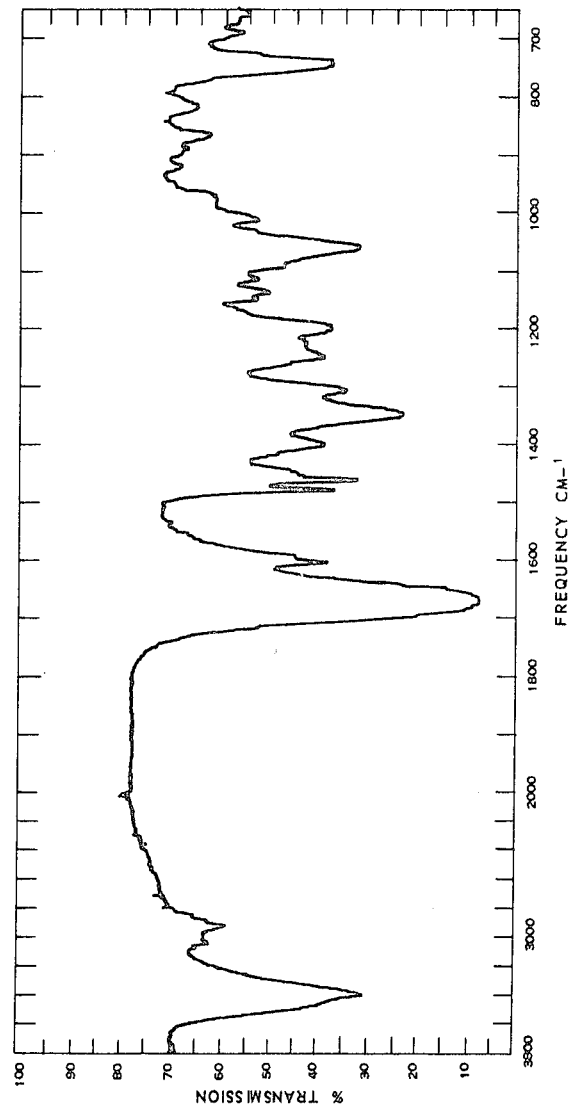

The infrared absorption spectrum of melinacidine when pressed in a KBr disc is reproduced in FIG. 2 of the drawing. Following is a tabulation of the wave-lengths from FIG. 2 expressed in reciprocal centimeters:

| | | | |
|---|---|---|---|
| 3480 | M | 1254 | M |
| 3400 | M | 1229 | M |
| 3045 | W | 1202 | M |
| 2920 | W | 1152 | M |
| 2880 | W | 1139 | M |
| 2840 | W | 1116 | W |
| 1694 | S | 1096 | M |
| 1684 | S | 1079 | S |
| 1674 | S | 1064 | S |
| 1654 | S | 1015 | M |
| 1646 | S | 979 | W |
| 1635 | M | 924 | W |
| 1609 | M | 904 | W |
| 1599 | M | 894 | W |
| 1484 | M | 869 | W |
| 1465 | M | 819 | W |
| 1450 | M | 774 | W |
| 1404 | M | 749 | M |
| 1354 | S | 689 | W |
| 1314 | M | 674 | W |
| 1306 | M | 659 | W |

Band intensities are indicated as: "S," "M," and "W," respectively, and are approximated in terms of the backgrounds in the viciity of the bands. An "S" band is of the same order of intensity as the strongest in the spectrum; "M" bands are between ⅓ and ⅔ as intense as the strongest band; and, "W" bands are less than ⅓ as intense as the strongest band. These estimates are made on the basis of a percent transmission scale.

Papergram pattern

Melinacidin has a characteristic papergram pattern as shown in FIG. 3 of the drawing when using the following solvent systems:

(I) 1-butanol, water (84:16), 16 hrs.
(II) 1-butanol, water (84:16) +0.25% p-toluene-sulfonic acid, 16 hrs.
(III) 1-butanol (acetic acid, water (2:1:1), 16 hrs.
(IV) 2% piperidine (v./v.) in 1-butanol, water (84:16), 16 hrs.
(V) 1-butanol, water (4:96), 5 hrs.
(VI) 1-butanol, water (4:96), +0.25% p-toluene-sulfonic acid, 5 hrs.
(VII) 0.5 M phosphate buffer pH 7.0, 5 hrs.

(VIII) 0.075 N NH₄OH, methylisobutyl ketone, (5:16:1000), lower phase 5 hrs.
(IX) benzene, methanol, water (1:1:2) equilibrated 16 hrs., developed 5 hrs.

ANTIBACTERIAL ACTIVITY OF MELINACIDIN

| Test microorganism: | Minimum inhibitory concentration in mcq./ml. |
|---|---|
| Salmonella pullorum | 25 |
| Staphylococcus aureus | <1.5 |
| Streptococus viridans | <1.5 |
| Streptococcus hemolyticus | <1.5 |
| Streptococcus faecalis | 3 |
| Proteus vulgaris | 25 |
| Bacillus subtilis | <1 |

The tube dilution assay procedure was conducted with the medium BHI (Brain Heart Infusion Broth, Difco, Detroit, Mich.). Assay tubes (13 mm. x 100 mm.) were prepared in the customary manner as set out in Snell, E. E., Vitamin Methods, vol. 1, Academic Press, Inc., New York (1950), p. 327. Test organisms grown for 18 hours at 37° C. were added to inoculate the test medium. The assays were read at 17 hours.

THE MICROORGANISM

The fungus used according to this invention for the production of melinacidin is a new variety of a known fungus and has been named *Acrostalaqmus cinnabarinus* var. *melinacidinus*. This variety is distinguished from other *Acrostalaqmus cinnabarinus* by its ability to produce melinacidin. A subculture of the living organism can be obtained from the permanent collection of the Northern Utilization and Research Division, Agricultural Research Service, U.S. Department of Agriculture, Peoria, Ill., U.S.A. Its assession number in this repository is NRRL 3291.

*Acrostalaqmus cinnabarinus* var. *melinacidinus*, which was studied and classified by Dr. Kurt E. Weinke, can be identified in its usual imperfect stage according to standard fungus taxonomic classification schemes, for example, F. E. Clements and C. L. Shear, "The Genera of Fungi," Hafner Publishing Co., New York (1957) page 203, and P. A. Saccardo, "Sylloge Fungorum" (1837) (lithoprinted by Edwards Brothers, Inc., Ann Arbor, Mich. (1944) vol. 4, page 163. The species *A. cinnabarinus* was described taxonomically by A. C. J. Corda, "Icones Fungorum" (1837) page 15. For some strains of this species the perfect stage of growth has also been observed and on this basis they have been classified also as *Nectria Inventa*, however the perfect stage of *A. cinnabarinus* var. *melinacidinus*, NRRL 3291 has not been observed.

The new complex of the invention is produced when the elaborating organism is grown in an aqueous nutrient medium under submerged aerobic conditions. It is to be understood, also, that for the preparation of limited amounts, surface cultures in bottles can be employed. The organism is grown in a nutrient medium containing a carbon source, for example, an assimilable carbohydrate, and a nitrogen source, for example, an assimilarble nitrogen compound or proteinaceous material. Preferred carbon sources include glucose, brown sugar, sucrose, glycerol, starch, corn starch, galactose, dextrin, molasses, and the like. Preferred nitrogen sources include corn steep liquor, yeast, autolyzed brewer's yeast with milk solids, soybean meal, cottonseed meal, corn meal, milk solids, pancreatic digest of casein, distiller's solubles, fish meal, animal peptone liquors, meat and bone scraps, and the like. A combination of these carbon and nitrogen sources can be used advantageously. Trace metals, for example, zinc, magnesium, manganese, cobalt, iron, and the like need not be added to the fermentation since tap water and unpurified ingredients are used as media components.

Production of the complex of the invention can be effected at any temperature conductive to satisfactory growth of the microorganism, for example, between about 18° and 40° C. and preferably between about 25° and 30° C. Ordinarily, optimum production of the compound is obtained in about 2 to 10 days. The medium normally stays fairly close to neutral, or on the alkaline side duriig the fermentation. The final pH is dependent, in part, on the buffers present, if any, and in part on the initial pH the culture medium which is advantageously adjusted to about pH 6–7 prior to sterilization.

When growth is carried out in large vessels and tanks, it is preferable to use the vegetative form, rather than the spore form of the microorganism for inoculation to avoid a pronounced lag in the production of the new complex and the attendant inefficient utilization of equipment. Accordingly, it is desirable to produce a vegetative inoculum in a nutrient broth culture by inoculating the broth culture with an aliquot from a soil or slant culture. When a young, active, vegetative inoculum has thus been secured, it is transferred aseptically to large vessels or tanks. The medium in which the vegetative inoculum is produced can be the same as, or different from, that utilized for the production of the new complex, as long as it is such that a good growth of the microorganism is obtained.

The new complex of the invention, melinacidin, as a neutral substance having the empirical formula

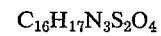

$$C_{16}H_{17}N_3S_2O_4$$

Melinacidin is soluble in chloroform, methylene chloride, dimethyl formamide, and dimethylsulfoxide. It has a lower degree of solubility in acetone and 95% ethanol, and it is relatively insoluble in water and saturated hydrocarbon solvents, for example, n-hexane, cyclohexane, and isomeric hexanes.

Melinacidin can be recovered from the fermentation broth by extraction procedures using water-immiscible solvents, for example, higher alcohols ($C_4$–$C_8$); higher ketones, for example, methyl isobutyl ketone; chlorinated hydrocarbon solvents, for example, methylene chloride; and esters, for example, ethyl acetate, and butyl acetate. Further purification of melinacidin can be accomplished by absorption on surface-active agents, for example, activated carbon, Florisil, and alumina. Melinacidin can be eluted from these surface-active agents by the use of solvents in which it is soluble, as described above.

In a preferred recovery process, the mycelium and undissolved solids are first separated from the fermentation beer by conventional means such as filtration with the use of a filter aid (or by centrifugation). The filtered beer (or centrifuged beer) is extracted with a solvent for melinacidin. Methylene chloride is preferred. The methylene chloride extract is washed with water, and the melinacidin is precipitated from the washed extract by the addition of Skellysolve B (isomeric hexanes). The precipitate is then filtered and dried in a vacuum oven. This preparation of crude melinacidin can be used in environments where a higher purity of the antibiotic is not necessary. Further purification of this melinacidin preparation can be accomplished by dissolving the preparation in acetone and methylene chloride and then passing the material over a Florisil column. The Florisil column can be eluted with a solvent system consisting of acetone-Skellysolve B (60:40 v./v.). The eluate from the column is concentrated to dryness and the preparation dissolved in acetone. The acetone solution is clarified by filtration and the clear filtrate concentrated to dryness. The residue is triturated with a 95% solution of ethanol whereupon crystallization of melinacidin results. The melinacidin crystals can be isolated by filtration, washed with 95% ethanol, and dried.

The new complex of the invention, melinacidin, inhibits the growth of various Gram-positive bacteria. For example, it is active against *Staphylococcus aureus*, *Salmonella pullorum*, *Bacillus subtilis*, and *Streptococcus faecalis*. Accordingly, melinacidin can be used as a disinfectant on washed and stacked food utensils contaminated with *Staphylococcus aureus*. It also can be used in petroleum product storage to control the microorganism *Bacillus subtilis*, which is a known slime and corrosion producer in petroleum products storage.

The following examples are illustrative of the process and products of the present invention but are not to be construed as limiting. All percentages are by weight and solvent mixture proportions are by volume unless otherwise noted.

EXAMPLE 1

Part A—Fermentation

A soil stock of *Acrostalagmus cinnabarinus* var. *melinacidinus*, NRRL 3291, was used to inoculate a series of 500-ml. Erlenmeyer flasks, each containing 100 ml. of sterile, preseed medium consisting of the following ingredients:

| | |
|---|---|
| Glucose monohydrate | g./liter__ 25 |
| Pharmamedia* | do____ 25 |
| Tap water q.s. | Balance |

*Pharmamedia is an industrial grade of cottonseed flour produced by Trader's Oil Mill Company, Fort Worth, Tex.

The flasks were grown for 4 days at 25° C. on a Gump rotary shaker operating at 250 r.p.m.

Three shake flasks (300 ml.) of the preseed inoculum, described above, was used to inoculate a 300-liter seed tank containing 250 liters of the following sterile seed medium:

| | |
|---|---|
| Lactose | g./liter__ 20 |
| Glucose monohydrate | do____ 5 |
| Urea | do____ 1 |
| $KH_2PO_4$ | do____ 0.5 |
| $MgSO_4$ | do____ 0.25 |
| Distiller's solubles | do____ 40 |
| UCON antifoam | ml./tank__ 100 |

The seed tank was agitated with an impeller rotating at 280 r.p.m. Sterile air was supplied at the rate of 80 liters/minute and the tank was incubated at 25° C. The seed was grown for 48 hours.

The seed tank, described above, was used to inoculate a 7000-liter fermentation tank containing 5000 liters of the following sterile medium:

| | |
|---|---|
| Blackstrap molasses | g./liter__ 25 |
| Yellow cornmeal | do____ 25 |
| UCON | liters__ 5 |
| Tap water | Balance |

The fermentor was agitated with an impeller revolving at the rate of 166 r.p.m., and sterile air was supplied to the fermentor at the rate of 80 cu. ft./minute. The fermentor was incubated for 5 days at a temperature of 25° C. At 114 hours, the fermentor broth assayed 86 biounits/ml. of melinacidin against the microorganism *Bacillus subtilis*. The *Bacillus subtilis* assay is a disc plate assay on synthetic agar. Samples of antibiotic to be assayed are diluted with phosphate buffer at pH 7.85. The ingredients of the synthetic agar are as follows:

| | |
|---|---|
| $Na_2HPO_4 \cdot 7H_2O$ | gm__ 1.5 |
| $KH_2PO_4$ | gm__ 4.3 |
| $(NH_4)_2SO_4$ | gm__ 1.0 |
| $MgSO_4$ | gm__ 0.1 |
| Glucose | mg__ 2.0 |
| Agar | gm__ 15.0 |
| Dist. water | liter__ 1 |
| Metallic ion stock solution [a] | ml__ 1 |
| Final pH | 6.2 |

[a] Metallic ion stock solution.

| Compound: | Concentration |
|---|---|
| $NaMoO_4 \cdot 2H_2O$ | mcg./ml__ 200 |
| $CoCl_2$ | do____ 100 |
| $CuSO_4$ | do____ 100 |
| $MnSO_4$ | mg./ml__ 2 |
| $CaCl_2$ | do____ 25 |
| $FeCl_2 \cdot 4H_2O$ | do____ 5 |
| $ZnCl_2$* | do____ 5 |

*$ZnCl_2$ has to be dissolved separately using a drop of 0.1 NCHl for 10 ml. of water. The stock solution is heated to bring all the compounds in solution, kept standing for 24 hours and sterile filtered.

The molten agar is seeded with an overnight culture of the microorganism, poured into a 20 × 50 cm. plastic tray and allowed to solidify. The fermentation beers to be tested are applied onto 12.7 mm. paper discs and these are placed on the surface of the seeded agar and incubated at 37° for 18 hrs.

A biounit is that amount of antibiotic, when dissolved in 0.08 ml. of the test solution and applied to a 12.7 mm. disc, which gives a 20 ml. zone of inhibition under standard microbiological assay conditions. Thus, if for example a fermentation beer has to be diluted 1/100 to give the 20 mm. zone of inhibition, the potency of such beer is 100 BU per ml.

Part B—Recovery

Whole beer (4700 liters assaying 210 biounits/ml. against the microorganism (*Bacillus subtilis*) from a melinacidin fermentation, as described above, was filtered using diatomaceous earth as a filter aid. The clear beer was adjusted to pH 7.0 with an aqueous sulfuric acid solution. Sodium chloride (500 lbs.) was added to the clear beer. The clear beer was then extracted batch-wise with three 1200-liter portions of methylene chloride. Emulsions were separated on a Titan centrifuge. The methylene chloride extracts were pooled, washed with 50 liters of water, and then concentrated to a volume of 4 liters. This concentrate was added to 200 liters of Skellysolve B. The resulting precipitated material (crude melinacidin) was then isolated by filtration and dried; yield 96 g. of crude melinacidin assaying 20 biounits/mg. on the *Bacillus subtilis* assay.

Part C—Purification

The crude preparation of melinacidin, disclosed above, was purified by the use of a Florisil column which was prepared from 4200 g. of Florisil packed in Skellysolve B. (The internal diameter of the column was 4 in.). The preparation of melinacidin (96 grams) was dissolved in acetone and methylene chloride and this solution was mixed with 340 g. of Florisil. This mixture was then contentrated to dryness and the dry residue was added on the top of the Florisil column bed. The column was then eluted as follows:

(1) 5 liters of Skellysolve B—The fraction resulting from this elution was discarded.

(2) 20 liters of acetone-Skellysolve B (30:70 v./v.)—The fraction resulting from this elution was also discarded.

(3) 50 liters of acetone-Skellysolve B (60:40 v./v.)—The fraction resulting from this elution was concentrated to dryness; yield, 62.8 g. of melinacidin assaying 128 biounits/mg. against the microorganism *Bacillus subtilis*. Two grams of this preparation of melinacidin was dissolved in 100 ml. of acetone. The solution was clarified by filtration and the clarified filtrate was concentrated to dryness. The residue was then triturated with 15 ml. of 95% ethanol. Crystallization of melinacidin started almost immediately. Melinacidin crystals were isolated by filtration, washed with 5 ml. of 95% ethanol and dried; yield, 600 mg.

We claim:

1. A composition of matter, melinacidin, assaying at least 86 biounits/ml., which (a) is effective in inhibiting the growth of Gram-positive and Gram-negative bacteria;
(b) is soluble in chloroform, methylene chloride, dimethyl formamide, and dimethyl sulfoxide; and is relatively insoluble, in water;
(c) has the following elemental analysis: C, 50.33; H, 4.32; N, 10.51; S, 17.31; O, 16.52;
(d) has an ultraviolet absorption maxima at 300 m$\mu$ (a.=7.93, in ethanol);
(e) has an optical rotation $[\alpha]_{25}^D = +736°$ (c. 0.394, $CHCl_3$); and which in its essentially pure crystalline form;
(f) has a characteristic infrared absorption spectrum in mineral oil mull as shown in FIG. 1 of the accompanying drawing;
(g) has a characteristic infrared absorption spectrum when pressed in a KBr disc as shown in FIG. 2 of the accompany drawing; and,
(h) has a characteristic papergram as shown in FIG. 3 of the accompany drawing.

2. Melinacidin, as defined in claim 1, in its essentially pure form.

3. Melinacidin, as defined in claim 1, in its essentially pure crystalline form.

4. The composition of matter of claim 1 in dry form assaying at least 20 biounits/mg. by a *Bacillus subtilis* assay.

5. A process which comprises cultivating a melinacidin-producing strain of *Acrostalagmus cinnabarinus* var. *melinacidinus* in an aqueous nutrient medium under aerobic conditions until substantial antibiotic activity is imparted to said medium by production of melinacidin, and isolating melinacidin from the culture medium.

6. A process, according to claim 5, which comprises cultivating *Acrostalagmus cinnabarinus* var. *melinacidinus* in an aqueous nutrient medium under aerobic conditions until substantial antibacterial activity is imparted to said medium by the production of melinacidin.

7. A process, according to claim 5, which comprises cultivating *Acrostalagmus cinnabarinus* var. *melinacidinus* in an aqueous nutrient medium containing a source of assimilable carbohydrates and assimilable nitrogen under aerobic conditions until substantial antibacterial activity is imparted to said medium by the production fo melinacidin, and isolating the melinacidin so produced.

8. A process accordng to claim 7 in which the isolation comprises filtering the medium, extracting the melinacidin from the filtrate, absorbing the melinacidin from the solvent extract, and recovering melinacidin from the adsorbent.

References Cited

Derwent Farm DOC #37,216, Abstracting N.E. 6815117, Published Apr. 29, 1969.

JEROME D. GOLDBERG, Primary Examiner

U.S. Cl. X.R.

195—80